(12) United States Patent  (10) Patent No.: US 8,296,787 B2
Chang                      (45) Date of Patent:     Oct. 23, 2012

(54) OPTICAL DISK DRIVE

(75) Inventor: Teng-Yuan Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 398 days.

(21) Appl. No.: 12/770,776

(22) Filed: Apr. 30, 2010

(65) Prior Publication Data

US 2011/0055855 A1   Mar. 3, 2011

(30) Foreign Application Priority Data

Aug. 27, 2009  (CN) .................. 2009 2 0308948 U

(51) Int. Cl.
  *G11B 17/056* (2006.01)
  *G11B 17/04* (2006.01)
  *G11B 33/08* (2006.01)
(52) U.S. Cl. .................... 720/611; 720/613; 720/651
(58) Field of Classification Search .......... 720/601, 720/610, 611, 613, 651
See application file for complete search history.

(56) References Cited

U.S. PATENT DOCUMENTS 7,140,029 B2 * 11/2006 Chiou et al. ................. 720/613
7,305,683 B2 * 12/2007 Namiki ........................ 720/610
7,757,243 B2 *  7/2010 Yim et al. .................... 720/613
2003/0117928 A1 *  6/2003 Choi et al. .................. 369/75.2
2005/0188389 A1 *  8/2005 Namiki ........................ 720/610
2006/0026611 A1 *  2/2006 Lee et al. ..................... 720/651

FOREIGN PATENT DOCUMENTS

| JP | 10199085 A | * | 7/1998 |
| JP | 11339350 A | * | 12/1999 |
| JP | 2002230880 A | * | 8/2002 |
| JP | 2003059250 A | * | 2/2003 |
| JP | 2005222590 A | * | 8/2005 |
| JP | 2007149279 A | * | 6/2007 |

* cited by examiner

*Primary Examiner* — Will J Klimowicz
(74) *Attorney, Agent, or Firm* — Altis Law Group, Inc.

(57) ABSTRACT

An optical disk drive includes a main body and a tray. The main body includes a housing, a first resisting member, and two rails. The first resisting member and the two rails are disposed in the housing. The tray is slidably coupled to the two rails, and is operable to be switched between a first state and a second state. The tray is received in the housing in the first state, and protrudes out of the housing in the second state. The tray includes a second resisting member, which is capable of being elastically compressed along a resisting direction substantially perpendicular to a sliding direction of the tray. The second resisting member is resisted by the first resisting member along the resisting direction to secure the tray in the first state. The second resisting member is away from the first resisting member in the second state.

16 Claims, 6 Drawing Sheets

OPTICAL DISK DRIVE

BACKGROUND

1. Technical Field

The present disclosure relates to optical pick-up devices, and particularly to an optical disk drive capable of tightly securing a tray.

2. Description of Related Art

An optical disk drive usually includes a main body and a tray slidably coupled to the main body. The main body includes two rails for allowing the tray to slide therein. To decrease resistance between the tray and the rails when the tray is sliding in or out, the tray is usually spaced a distance away from the rails. Thus, when the optical disk drive reads or writes to a spinning optical disk, the vibration of the tray caused by the play between the tray and the rails may lead to erroneous data being read from or written to the disk.

Therefore, it is desirable to provide an optical disk drive capable of tightly securing a tray, which can overcome the above-mentioned problems.

BRIEF DESCRIPTION OF THE FIGURE

The components of the drawings are not necessarily drawn to scale, the emphasis instead being placed upon clearly illustrating the principles of the embodiment of an optical disk drive. Moreover, in the drawings, like reference numerals designate corresponding parts throughout several views.

DETAILED DESCRIPTION

Embodiments of the present disclosure will now be described in detail with reference to the drawings.

Figure 1:
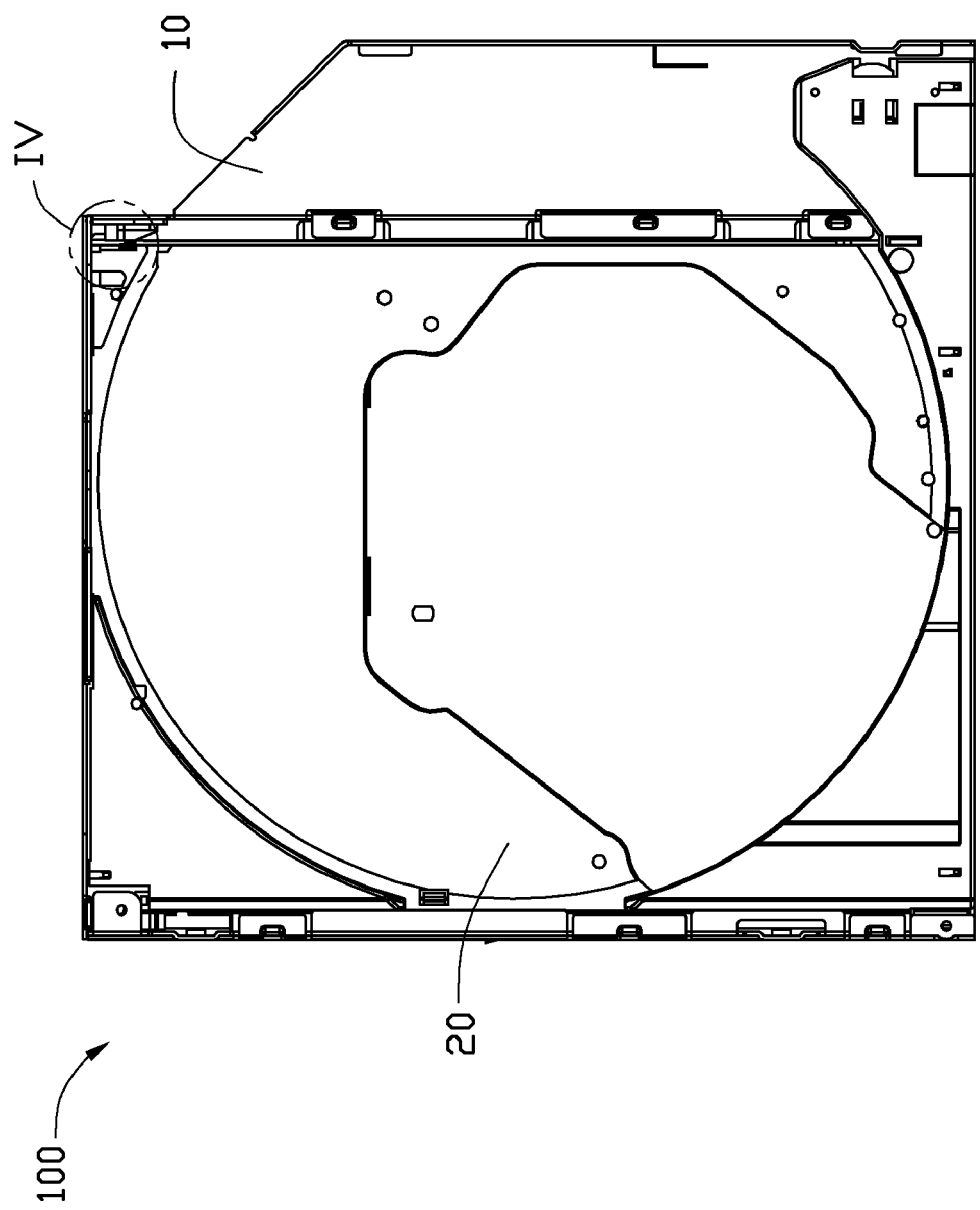
FIG. 1 is an assembled, isometric, schematic view of an optical disk drive in a first state, according to an exemplary embodiment.
Figure 2:
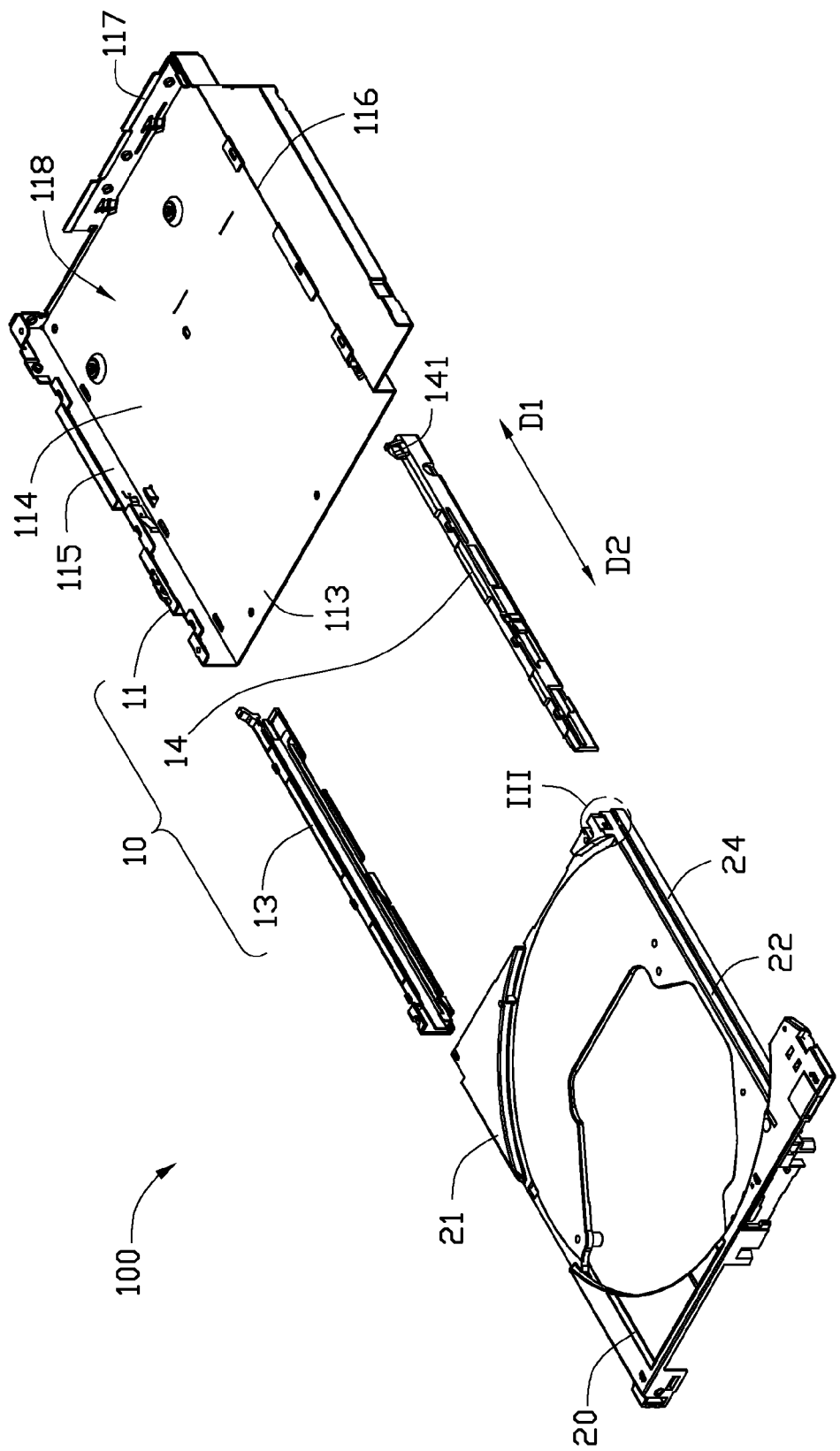
FIG. 2 is an exploded view of the optical disk drive of FIG. 1.

Referring to FIGS. 1 and 2, an optical disk drive (ODD) 100 in accordance with an exemplary embodiment is illustrated. In the embodiment, the optical disk drive 100 may be a slim type version, particularly employed in a laptop computer (not shown). The ODD 100 includes a main body 10 and a tray 20 slidably coupled to the main body 10. The tray 20 is adapted to receive an optical disk (not shown). When the tray 20 is completely received in the main body 10, the disk drive 100 is operable to drive the optical disk.

The main body 10 includes a housing 11, a first rail 13, and a second rail 14. The housing 11 includes a bottom plate 114 and three sidewalls 115, 116, 117 extending upright from three edges of the bottom plate 114 respectively. The sidewall 115 is substantially parallel to the sidewall 116. The sidewall 117 is substantially perpendicularly connected between the sidewalls 115 and 116. The housing 11 defines a receiving space 118 bounded by the sidewalls 115, 116 and 117. The first rail 13 and the second rail 14 are slidably disposed in the housing 11 and connected to the sidewalls 115, 116 respectively. The first rail 13 is substantially parallel to the second rail 14. The first rail 13 and the second rail 14 are operable to slide along a first direction D1 to be completely received in the housing 11 and along a second direction D2 to partially protrude out of the housing 11. The first direction D1 is opposite to the second direction D2.

Figure 4:
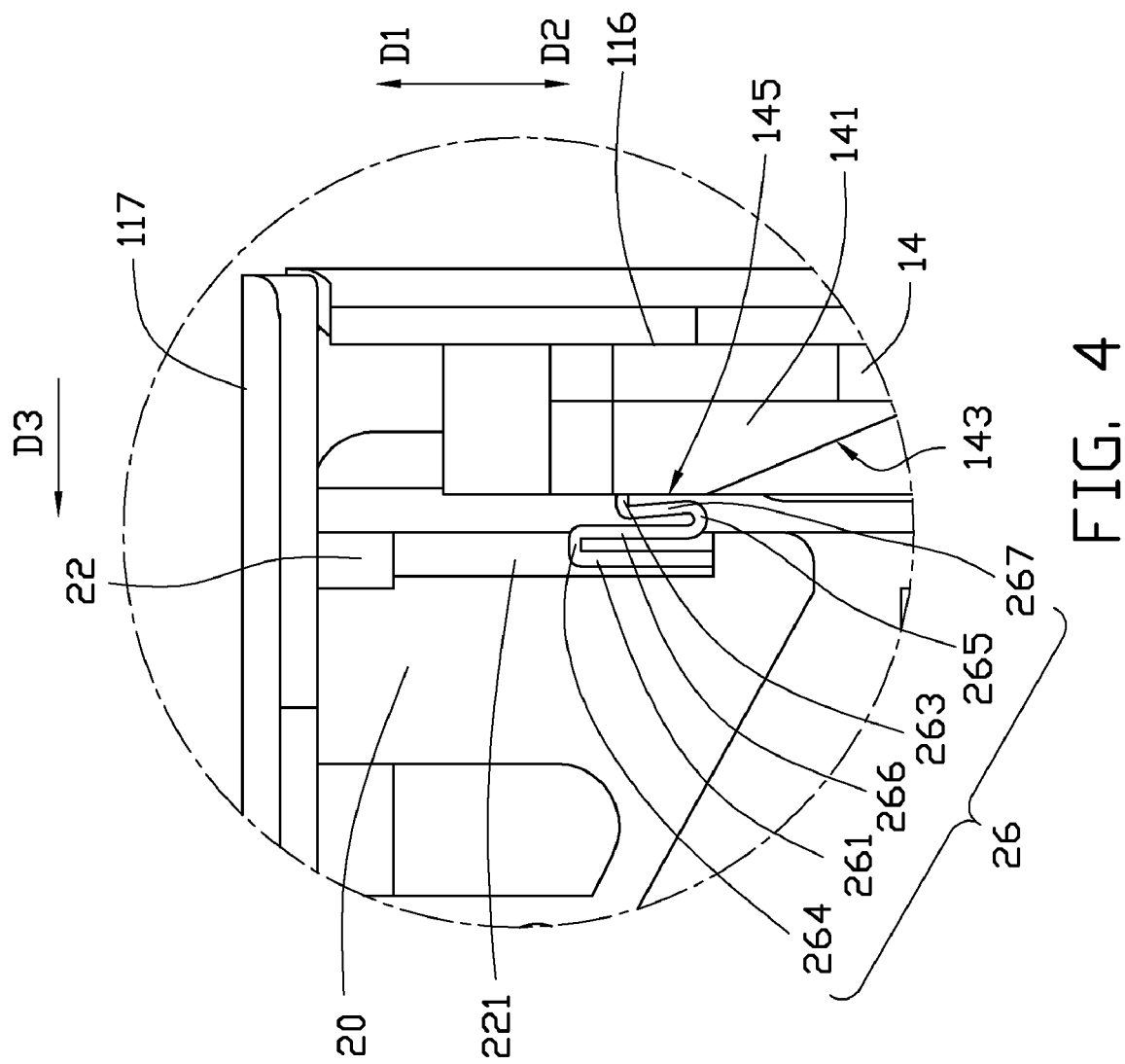
FIG. 4 is an enlarged view of a circled portion IV of FIG. 1.

The second rail 14 includes a first resisting member 141 formed on one end of the second rail 14 adjacent to the sidewall 117. The first resisting member 141 includes a resisting surface 145 and a guiding surface 143 (shown in FIG. 4). The resisting surface 145 is positioned away from the sidewall 116 and substantially parallel to the first direction D1. The guiding surface 143 is connected to one end of the resisting surface 145 away from the sidewall 117. The guiding surface 143 is inclined with respect to the resisting surface 145, and forms an acute angle with the second direction D2.

The tray 20 includes two opposite side surfaces 21 and 22. The side surfaces 21 and 22 face the first rail 13 and the second rail 14 respectively. The tray 20 further includes two elongated slide bars 24 formed on the side surfaces 21 and 22 respectively. The slide bars 24 are substantially parallel to the first rail 13 and the second rail 14. The slide bars 24 are slidably connected to the first rail 13 and the second rail 14 respectively, such that the tray 20 is slidable with respect to the main body 10.

Figure 3:
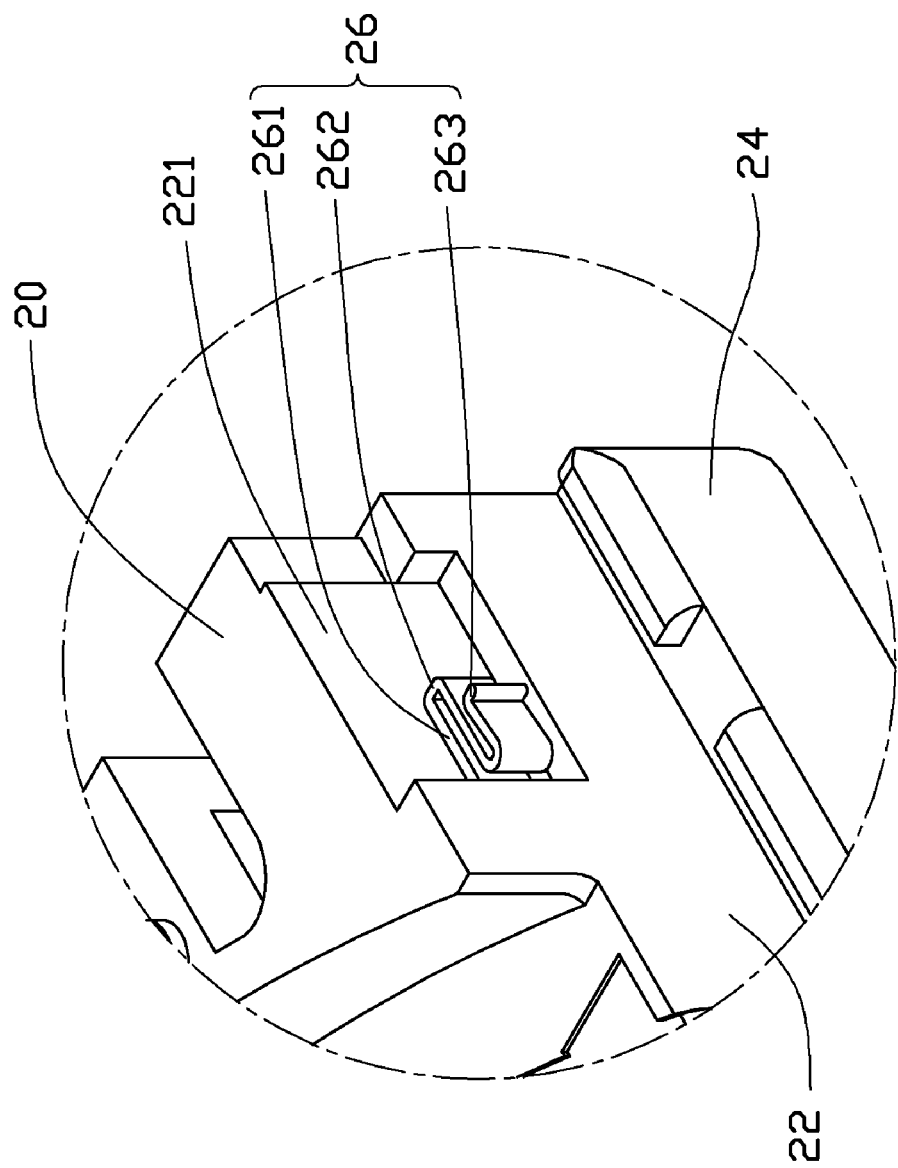
FIG. 3 is an enlarged view of a circled portion III of FIG. 2.

Referring to FIG. 3, the tray 20 defines a concave space 221 in the side surface 22 adjacent to one end of the tray 20 towards the sidewall 117 of the housing 11. The tray 20 includes a second resisting member 26 suspended in the space 221. The second resisting member 26 includes a cantilever beam 261, a spring portion 262, and a resisting portion 263.

One end of the cantilever beam 261 is fixed to the tray 20, such that the cantilever beam 261 extends into and is suspended in the space 221. The cantilever beam 261 is substantially parallel to the slide bar 24, and is elastically deformable towards the space 221. The spring portion 262 is a winding sheet connected to a distal end of the cantilever beam 261. In this embodiment, the spring portion 262 includes a first spacing portion 264, a second spacing portion 265, a first beam 266, and a second beam 267. The first spacing portion 264 extends upright from the distal end of the cantilever beam 261. The first beam 266 connects to the first spacing portion 264 and is suspended over the cantilever beam 261. The second spacing portion 265 extends upright from one end of the first beam 266 away from the first spacing portion 264. The second beam 267 connects to the second spacing portion 265 and is suspended over the first beam 266. The first beam 266 and the second beam 267 are substantially parallel to and deformable toward the cantilever beam 261. As such, the spring portion 262 can be elastically compressed. The resisting portion 263 is connected to a distal end of the second beam 267 away from the cantilever beam 261 and protrudes out of the space 221.

When the tray 20 slides along the first direction D1 (FIG. 4) to be received in the housing 11, the guiding surface 143 is adapted to guide the resisting portion 263 to the resisting surface 145. When the tray 20 is completely received in the housing 11 (the first state), the resisting portion 263 is pressed by the resisting surface 145, thus the spring portion 262 is compressed and the cantilever beam 261 is elastically deformed towards the space 221 accordingly. Therefore, the first resisting member 141 applies a resisting force to the second resisting member 26 so as to tightly secure the tray 20. The direction D3 of the resisting force is substantially perpendicular to the first direction D1 and the second direction D2. Thereby, vibration of the tray 20 during use can be decreased due to the resisting force.

Figure 5:
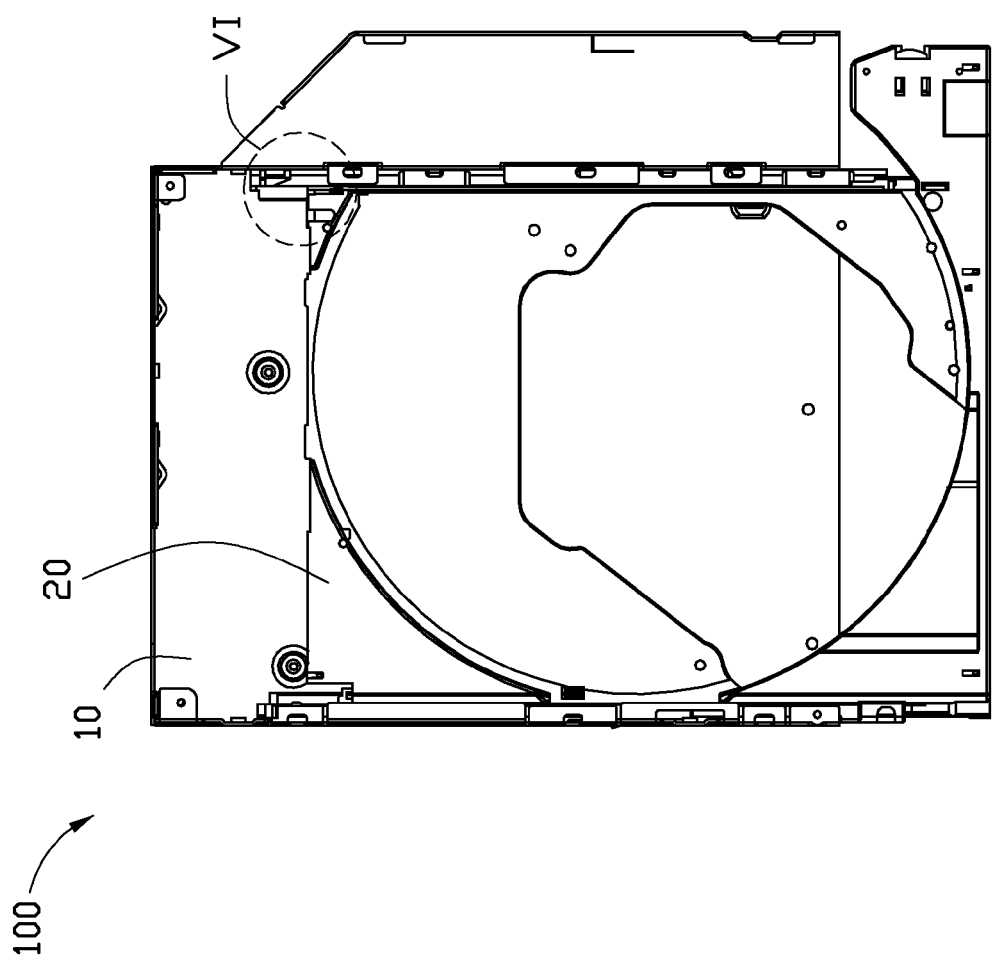
FIG. 5 is a schematic view of the optical disk drive of FIG. 1 in a second state.
Figure 6:
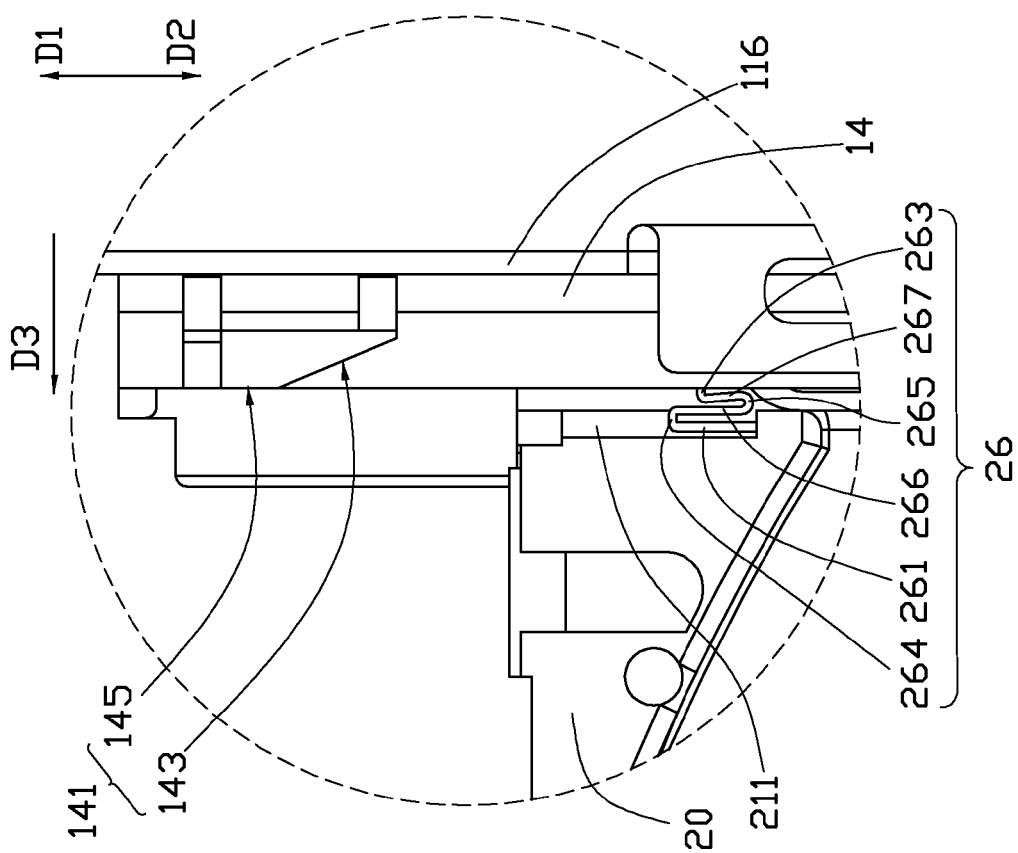
FIG. 6 is an enlarged view of a circled portion VI of FIG. 5.

Referring to FIGS. 5 and 6, when the tray 20 slides a predetermined distance along the second direction D2 to be in the second state, the second resisting member 26 departs from the first resisting member 141 and is spaced a distance away from the second rail 14. As such, a resistance to movement of the tray 20 is decreased.

In other embodiments, the second resisting member 26 can be disposed on the main body 10, and the first resisting member 141 can be disposed on the tray 20 correspondingly. Alternatively, two second resisting members 26 can be mounted on both the side surfaces 21 and 22. Correspondingly, the first resisting members 141 can be mounted on both the first rail 13 and the second rail 14.

Additionally, the first rail 13 and the second rail 14 do not necessarily need to be slidable with respect to the housing 11. Alternatively, the first rail 13 and the second rail 14 can be fixed to the housing 11.

Furthermore, the cantilever beam 261 can be omitted in other embodiments. Correspondingly, the spring portion 262 is fixed to the tray 20.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. An optical disk drive, comprising:
   a main body comprising a housing, a first resisting member, and two rails, the first resisting member and the two rails being disposed in the housing; and
   a tray slidably coupled to the two rails, the tray being operable to be switched between a first state and a second state, the tray being received in the housing in the first state, the tray protruding out of the housing in the second state, the tray comprising a second resisting member capable of being elastically compressed along a resisting direction substantially perpendicular to a sliding direction of the tray, the second resisting member being resisted by the first resisting member along the resisting direction to secure the tray in the first state, and being away from the first resisting member in the second state;
   wherein the second resisting member comprises a spring portion and a resisting portion connected to the spring portion, the spring portion is operable to be elastically compressed along the resisting direction, the resisting portion is operable to be resisted by the first resisting member; wherein the tray defines a concave space; the second resisting member further comprises an elastically deformable cantilever beam extending into and suspended in the concave space, the spring portion is connected to a distal end of the cantilever beam; the resisting portion protrudes out of the concave space.

2. The optical disk drive of claim 1, wherein the first resisting member comprises a resisting surface and a guiding surface connected to the resisting surface, the guiding surface is inclined with respect to the resisting surface, the guiding surface is adapted to guide the resisting portion to the resisting surface when the tray is moved to be received in the main body.

3. The optical disk drive of claim 1, wherein the main body comprises a housing, a first rail, and a second rail, the first rail and the second rail are disposed in the housing, the tray is slidably coupled to the first rail and the second rail.

4. The optical disk drive of claim 3, wherein the first resisting member is disposed at one end of the second rail, the second resisting member is disposed at a corresponding end of the tray.

5. The optical disk drive of claim 3, wherein the first rail and the second rail are slidably coupled to the housing.

6. The optical disk drive of claim 3, wherein the tray comprises two slide bars, the two slide bars are slidably coupled to the first rail and the second rail respectively.

7. An optical disk drive, comprising:
   a main body comprising a first resisting member; and
   a tray comprising a second resisting member, the tray being operable to slide in the main body substantially along a first direction and a second direction, to switch between a first state and a second state, the second resisting member being operable to be elastically compressed along a third direction substantially perpendicular to the first direction and the second direction;
   wherein in the first state, the tray is substantially completely received in the main body and the first resisting member cooperating with the second member to secure the tray for preventing the tray from being moved at least along the third direction, the tray protruding out of the main body and the first resisting member being away from the second resisting member in the second state;
   wherein the second resisting member comprises a spring portion and a resisting portion connected to the spring portion, the spring portion is operable to be elastically compressed along the third direction, the resisting portion is adapted to resist the first resisting member;
   wherein the first resisting member comprises a resisting surface and a guiding surface connected to the resisting surface, the guiding surface is inclined with respect to the resisting surface, the guiding surface is adapted to guide the resisting portion to the resisting surface when the tray is moved to be substantially completely received in the main body.

8. The optical disk drive of claim 7, wherein the tray defines a concave space, the second resisting member further comprises an elastically deformable cantilever beam extending into and suspended in the concave space, the spring portion is connected to a distal end of the cantilever beam, the resisting portion protrudes out of the concave space.

9. The optical disk drive of claim 7, wherein the first resisting member is adapted to apply a resisting force to the second resisting member along the third direction.

10. The optical disk drive of claim 7, wherein the main body comprises a housing, a first rail, and a second rail, the first rail and the second rail are disposed in the housing, the tray is slidably coupled to the first rail and the second rail.

11. The optical disk drive of claim 10, wherein the first resisting member is disposed at one end of the second rail, the second resisting member is disposed at a corresponding end of the tray.

12. The optical disk drive of claim 10, wherein the first rail and the second rail are slidably coupled to the housing.

13. The optical disk drive of claim 10, wherein the tray comprises two slide bars, the two slide bars are slidably coupled to the first rail and the second rail respectively.

14. An optical disk drive, comprising:
   a main body comprising a first resisting member; and
   a tray defining a concave space and comprising a second resisting member suspending in the concave space, the second resisting member being adapted to resist the first resisting member when the tray is substantially completely received in the main body;

wherein the second resisting member comprises a cantilever beam, a spring portion, and a resisting portion, the cantilever beam extends into and is suspended in the concave space, the spring portion comprises a first spacing portion, a second spacing portion, a first beam, and a second beam, the first spacing portion extends upright from a distal end of the cantilever beam, the first beam is connected to the first spacing portion and suspends over the cantilever beam, the second spacing portion extends upright from one end of the first beam away from the first spacing portion, the second beam is connected to the second spacing portion and suspends over the first beam, the first beam and the second beam are substantially parallel to and deformable toward the cantilever beam, the resisting portion is connected to a distal end of the second beam and protrudes out of the concave space.

15. The optical disk drive of claim 14, wherein the main body comprises a housing, a first rail, and a second rail, the first rail and the second rail are disposed in the housing, the tray is slidably coupled to the first rail and the second rail.

16. The optical disk drive of claim 15, wherein the tray comprises two slide bars, the two slide bars are slidably coupled to the first rail and the second rail respectively.

* * * * *